(12) United States Patent
Gotz et al.

(10) Patent No.: US 9,817,225 B2
(45) Date of Patent: Nov. 14, 2017

(54) TELESCOPIC SIGHT

(71) Applicant: Schmidt & Bender GmbH & Co. KG, Biebertal (DE)

(72) Inventors: Anastasia Gotz, Wetzlar (DE); Manuel Schmidt, Wetzlar (DE); Helke Karen Hesse, Giessen (DE); Karlheinz Gerlach, Biebertal (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 0 days.

(21) Appl. No.: 14/219,158

(22) Filed: Mar. 19, 2014

(65) Prior Publication Data

US 2014/0285882 A1  Sep. 25, 2014

(30) Foreign Application Priority Data

Mar. 19, 2013  (DE) .................. 10 2013 102 826

(51) Int. Cl.
*G02B 23/14* (2006.01)
*F41G 1/38* (2006.01)
*G02B 23/00* (2006.01)

(52) U.S. Cl.
CPC ............. *G02B 23/145* (2013.01); *F41G 1/38* (2013.01)

(58) Field of Classification Search
CPC .... G02B 6/4202; G02B 6/4214; G02B 7/003; G02B 7/004; G02B 13/02; G02B 23/00; G02B 23/02; G02B 23/04; G02B 23/10; G02B 23/105; G02B 23/14; G02B 23/145; G02B 27/0189; G02B 27/0905; G02B 27/0972; G02B 27/126; G02B 27/32–27/36; G02B 2027/0141;
(Continued)

(56) References Cited

U.S. PATENT DOCUMENTS 4,531,052 A * 7/1985 Moore ..................... 235/404
2008/0098640 A1* 5/2008 Sammut et al. ............ 42/122
(Continued)

FOREIGN PATENT DOCUMENTS

DE  30 48 534   7/1982
DE  29 903 989  6/1999
(Continued)

*Primary Examiner* — Stephone B Allen
*Assistant Examiner* — Adam W Booher
(74) *Attorney, Agent, or Firm* — Clark & Brody

(57) ABSTRACT

A telescopic sight has an objective lens system, an eyepiece lens system and an inversion system disposed in the optical path between the objective lens system and the eye piece lens system and pivotably supported by means of a height adjustment device, a lateral adjustment device, a reticle, and a projection means disposed at the end of the inversion system on the eyepiece side. The inversion system generates an image plane at the end on the eyepiece side having a perpendicular alignment relative to the inversion system optical axis. The projection means generates a projection in the field of view of the sight, which is located in a projection plane, wherein the projection plane is aligned perpendicularly relative to the optical axis and in the image plane of the inversion system. A display means assigned to the inversion system generates information and/or a target mark in the projection plane.

15 Claims, 3 Drawing Sheets

(58) Field of Classification Search
CPC ..... G02B 2027/019; F41G 1/345; F41G 1/38; F41G 1/473; F41G 3/06–3/065
USPC .................. 359/424, 427–428; 42/122, 130
See application file for complete search history.

(56) References Cited

U.S. PATENT DOCUMENTS

| | | | |
|---|---|---|---|
| 2009/0223107 A1* | 9/2009 | Lin | F41G 1/38 42/115 |
| 2010/0175298 A1* | 7/2010 | Thomas | F41G 1/18 42/122 |
| 2011/0047854 A1* | 3/2011 | Schlierbach | 42/119 |
| 2013/0033746 A1 | 2/2013 | Brumfield | |
| 2013/0199074 A1* | 8/2013 | Paterson | F41G 3/06 42/122 |

FOREIGN PATENT DOCUMENTS

| | | |
|---|---|---|
| DE | 199 40 118 | 3/2001 |
| DE | 199 49 800 | 4/2001 |
| DE | 10 2006 035 777 | 2/2008 |
| DE | 20 2008 012 601 | 11/2008 |
| DE | 10 2010 005 122 | 7/2011 |

\* cited by examiner

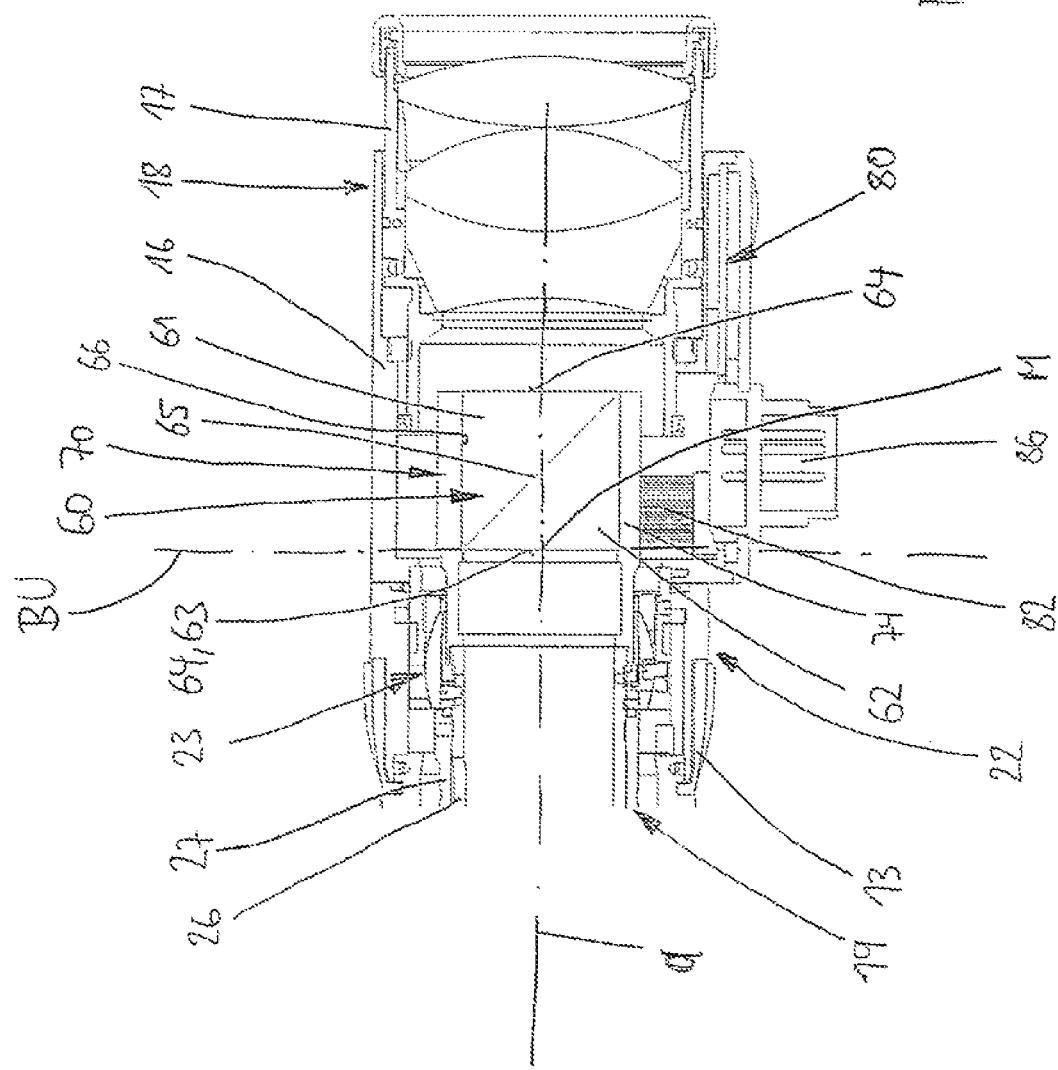

TELESCOPIC SIGHT

FIELD OF THE INVENTION

The invention relates to a telescopic sight according to the preamble of claim 1.

BACKGROUND

Telescopic sights usually have an eyepiece lens system and an objective lens system, as well as one or a plurality of sight aids that are visible in the optical path, which are provided, depending on the structural type, in the first image plane on the lens side and/or in the second image plane of the telescopic sight on the eyepiece side. Typically, an inversion system is disposed between the two image planes. Said inversion system aligns the image that is upside down and laterally inverted. Furthermore, with the inversion system, it is possible to achieve a variable magnification of the telescopic sight.

The prior art specifies various sight aids. A sight aid can be, for example, a reticle that is often configured as a hair-line graticule having a structure with different patterns. A configuration that is especially common is the crosshairs sight aid. Aside from this simple design type, more complex types of reticles are known as well. They can include characteristics, for example, that simplify estimating the distance to a target. Illumination means are used to ensure satisfactory visibility of the reticle on the target image even in poor lighting conditions and at dusk.

The specification DE 299 03 989 U1 discloses a sight aid that has an inversion system disposed in the optical path between the eyepiece lens system and the objective lens system inside a guide tube that is pivotably supported by means of height and lateral adjustment devices in relation to the optical axis of the telescopic sight. A mount is configured at the end of the guide tube on the lens side that accommodates a reticle and a beam splitter. The reticle includes markings in form of crosshairs, while the beam splitter generates an additional glowing target mark by means of a projection means, which is also moved by the height and lateral adjustment devices of the telescopic sight. Correspondingly, the sight aids always have the same distances, inclination angles and dimensions for the shooter. However, aside from the target mark, fading in further information or sight aids that are to be displayed in the optical path is not possible. Moreover, it is not possible to modify and/or adjust or move the target mark, which was generated by the projection means, as a function of ballistic data or conditions, thereby restricting the area of application of the telescopic sight.

In order to avoid that the target mark, which is generated by the projection means and the beam splitter, covers up the target object when adjusting the magnification of the telescopic sight by means of the invention system, DE 10 2010 005 122 A1 envisions disposing the beam splitter, which is located between the eyepiece and objective lens systems, inside the optical path, at the end of the guide sleeve of the inversion system on the eyepiece side. The reticle is disposed as a hair-line graticule at the opposite end of the guide sleeve of the inversion system on the lens side. In this instance, it is presently disadvantageous as well that, aside from the target mark, no further information or sight aids can be faded into the optical path. Furthermore, neither the reticle nor the target mark, which is generated by the projection means, can be modified and/or adjusted or moved as a function of ballistic data or conditions, thereby restricting the area of application and the functionality of the telescopic sight.

DE 199 49 800 A1 discloses a telescopic sight that uses a laser distance-measuring device for estimating the distance between the shooter and the target; said device emits a laser beam via a first prism that is disposed in the optical path and receives the light rays that are reflected by the target object via a receiving prism that is also disposed in the optical path. Based on the measured distance information and ballistic data, previously stored by the shooter, a microprocessor conducts a compensation calculation, whereby a distance to the target and a compensation of the trajectory are obtained. Both pieces of information are displayed in a first image plane by means of a further beam splitter, which is also disposed between the objective lens system and the inversion system. The inversion system allows for adjusting various magnification levels, whereby the image of the target and the required value of the compensation are enlarged correctly and without any distortions. However, it is problematic herein that, when adjusting the magnification level of the telescopic sight, the target is covered up not only by the target mark but also by the information that was faded in, which is cumbersome especially with large magnifications. Moreover, if the electronic means are switched off or inoperable, a compensation of the trajectory is no longer possible, because no related necessary information and auxiliary means are available. The prisms, that are disposed in the optical path, can, however, shade the field of view, thereby restricting the same and disadvantageously affecting the use of the telescopic sight.

The specification DE 30 48 534 A1 foregoes mechanical and/or mechanically adjustable reticles completely and uses an electronic display means that is electronically triggered and visualizes the respective optimum target mark in the sight based on distance data and other information. The display comprises light-emitting diodes, the use of a liquid-crystal display is also possible. Moreover, the effective distance values, derivative values and the like can be faded into the field of view of the telescopic sight to assist the shooter. However, if the electronic display device on such a sight is inoperable, no sight aid is available whatsoever.

SUMMARY

The object of the invention seeks to overcome these and further disadvantages of the prior art and develop a telescopic sight that reflects reliable information into the field of view by means of an electronic display means, and that generates, if needed, an electronically modified reading, and that has, independently of all electronic components, the mechanical and optical features of a telescopic sight as well, thus allowing for estimating distances and compensating a trajectory. It is another object of the invention to provide a more cost-effective and more robust structural assembly of the telescopic sight.

The main features of the invention are laid out in the characterizing portion of Claim 1. Configurations are the subject-matter of Claims 2 to 15.

In a telescopic sight with an objective lens system, an eyepiece lens system and an inversion system, which is disposed in the optical path between the objective lens system and the eyepiece lens system and pivotably supported in relation to the optical axis of the telescopic sight by means of a height adjustment device and a lateral adjustment device, with a reticle that is disposed at the end of the inversion system on the objective lens side, and with a projection means that is disposed at the end of the inversion system on the eyepiece side, according to the invention, the inversion system generates an image plane at the end on the eyepiece side having a perpendicular alignment relative to the optical axis of the inversion system, and the projection means generates a projection in the field of view of the telescopic sight, which is located in a projection plane, wherein the projection plane is aligned perpendicularly relative to the optical axis of the inversion system and located in the image plane of the inversion system, and a display means is allocated to the inversion system that generates information and/or an electronically generated target mark in the projection plane by means of the projection means.

Correspondingly, the location of the projection for information as well as for electronically generated and modifiable target marks is always located in the rear-side image plane of the inversion system that is always fixedly disposed in relation to the optical axis of the inversion system; meaning, the projection location is always—independently of any tilting or pivoting of the inversion system effected by the height or lateral adjustment devices relative to the optical axis of the telescopic sight—perpendicular in relation to the optical axis of the inversion system and plane-parallel within the rear-side image plane of the inversion systems, whereby the target motif and the projection image are always tilted and/or pivoted together with the inversion system. Therefore, it no longer possible for target point variations to occur, even toward the edge of the lens system. Simultaneously, the solution according to the invention offers numerous options for beneficial uses, depending on the purpose for which the telescopic sight is used.

For example, there exists the option of placing pure information in the second image plane of the telescopic sight. This approach allows the shooter to see information in the field of view at the height of the second image plane of the telescopic sight, and wherein said information is transmitted by devices (for example, a laser distance-measuring device) that are optionally integrated in the telescopic sight or that can be externally coupled thereto.

In addition or in the alternative, the display means is able to generate an electronically movable target mark. With this approach the shooter can implement an automatic target mark correction on the basis of the information transmitted by devices that are optionally integrated in the telescopic sight (for example, a laser distance-measuring device) or that can be externally coupled thereto.

Due to the fact, however, that information and/or target marks, which are generated by the display means and that are represented by the projection device in the projection plane, are not immovable and do not remain stationary in a single position in the second image plane on the eyepiece side of the eyepiece lens system, and wherein, instead, they are moved together with the actual image of the telescopic sight in the image plane of the inversion system on the eyepiece side, when the inversion system is tilted in relation to the optical axis of the telescopic sight in connection with a correction of the trajectory, it is thus possible to implement information and target marks that always move in asynchronous and congruent manner together with the image. Preferably, the center points of the image planes of the eyepiece lens system and of the inversion system, as well as of the projection plane of the projection means therein are disposed congruently on top of each other.

However, if the electronic system is deactivated or fails completely, it is possible to use the reticle on the lens side by means of the still-available height and lateral adjustment devices in the conventional manner in order to achieve any necessary correction of the trajectory. Therefore, the telescopic sight according to the invention can be used under any conditions, irrespective of how difficult the circumstances, particularly for military applications, because a fully functional back-up solution is always available in the event of an electronic malfunction or failure.

An important embodiment of the invention provides that the projection device is made of two prisms that rest directly against each other by the base surfaces thereof, which are inclined in relation to the optical axis of the inversion system, wherein the base surfaces constitute a semi-permeable boundary area. A prism arrangement of this kind is usually a beam splitter that can be provided simply and cheaply. The prisms offer the added advantage that the incoming light from the lens is minimally absorbed or reflected. The target optics thus offer good target image quality, even when the visibility is poor.

It is also advantageous if a front side of a prism, which is directed toward the objective lens system, constitutes the projection plane. Said projection plane can be precisely arranged via the prism and exactly aligned relative to the optical axis of the inversion system.

In terms of construction, it is further advantageous if the display means is connected to one of the prisms of the projection means. The display means and the prisms thus constitute a stable unit that, moreover, only requires minimal assembly space.

An important improvement of the invention provides that the projection means and/or the display means is/are adjustably configured in relation to the optical axis of the inversion system, preferably along the optical axis of the inversion system. This way, it is possible for the image representation, which is generated by the display means, to be optimally focused in the projection plane of the projection means at all times, thus providing the shooter with a clear and well defined representation in the field of view of the telescopic sight.

Important benefits of the invention are achieved, furthermore, when the projection means and the display means are disposed in a common mount that is connected to the inversion system. This provides for a further improvement of the stability and capacity to withstand stresses. In addition, advantageously, the mount is adjustably configured in relation to the inversion system and the optical axis of the inversion system, preferably along the optical axis of the inversion system. This way, it is possible to optimally adjust and focus image representations that are created by the display means and generated the projection means in the optical path of the telescopic sight with special ease, thereby always providing the shooter with a clearly detectable and sharply defined image representation. To prevent the image, generated by the display means and the projection means, from rotating in the field of view of the telescopic sight, at least the projection means and the display means are disposed in a torque-proof manner in relation to the optical axis of the telescopic sight or of the inversion system, respectively.

Further constructive benefits are achieved if the projection means, the display means and/or the mount constitute a single structural unit. Said assembly can be designed as a preassembled unit, thereby simplifying the overall assembly and providing advantages in terms of the production costs of the telescopic sight.

To provide the necessary capacity for generating the desired or necessary information for the shooter, the display means is triggered by a programmable electronic control device, that implements a compensatory calculation of the trajectory based on ballistic and/or other data. The data that are necessary for this purpose can be detected by means of measuring devices and sensors, which are integrated in the telescopic sight. In addition, it is possible to input data or information via a suitable input means into the control device, that is preferably provided with a microprocessor and a memory in order to be able to store and reproduce the detected, input and/or computed data via a display means. The use of external devices and sensors, which route their information and data to a microprocessor of the control device, is possible as well for the purpose of data detection such as, for example, distance, wind speed, shooting direction, and the like. To this end, the control device includes an interface for accepting data. This interface can be a plug-and-socket connection that allows for a quick and comfortable equipment hookup. A wireless exchange of the data and computed values is also possible. To this end, the control device is provided with a transmitter and receiver.

A further embodiment of the invention provides that the control device is connected to the display means via a cable connection or a wireless connection.

Further possible uses of the telescopic sight result if, aside from the display means, an additional light source is provided on or in the inversion system. A further target mark can be generated therein, if necessary, that is then reflected into the rear-side image plane of the inversion system. In addition or in the alternative, it is possible to dispose a further reticle in the image plane of the inversion system.

An illumination means, which is switchable and/or dimmable, is provided for the reticle at the end of the inversion system on the lens side to ensure good visibility of the reticle even at dusk or under unfavorable lighting conditions, and/or if a further reticle is present.

BRIEF DESCRIPTION OF THE DRAWINGS

Further characteristics, details and benefits of the invention can be derived from the claims, as well as from the following description of embodiments of the invention that are illustrated based on the drawings. Shown are as follows:

FIG. 3 is a schematic view of a partial sectional representation of another embodied example of the telescopic sight according to the invention.

DETAILED DESCRIPTION

Figure 1:
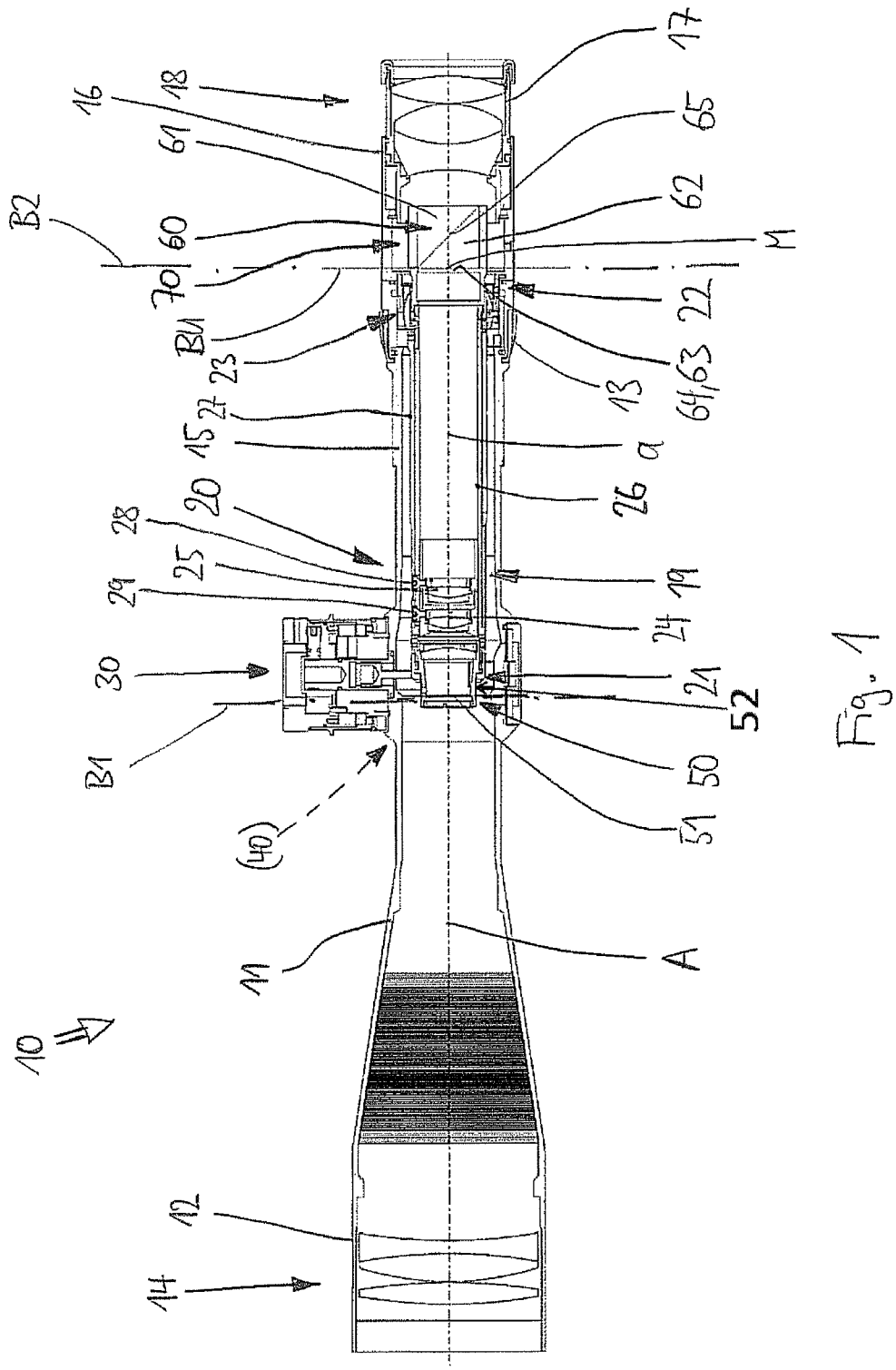
FIG. 1 is a schematic view of a longitudinal section of a telescopic sight according to the invention.

The telescopic sight, as identified in FIG. 1 by the numeral 10, has a housing 11 that includes, along an optical axis A, a lens tube 12, a center tube 15 and an eyepiece tube 16. An objective lens system 14 is disposed inside the lens tube 12, while a rotatable sleeve 17 with a eyepiece lens system 18 is configured on the end side of the eyepiece tube 16.

An inversion system 20 is provided inside the center tube 15 in the optical path between the objective lens system 14 and the eyepiece lens system 18, and the inversion system is disposed in an internal tube 19 and that can be pivoted together with the same in relation to the optical axis A of the telescopic sight 10. To this end, the internal tube 19 is pivotably supported inside a swivel bearing 23 on the side thereof that is directed toward the eyepiece lens system 16, while, on the end thereof that is directed toward the objective lens system 14, a height adjustment device 30 and a lateral adjustment device, which is only hinted at by the reference numeral 40 in FIG. 1, engage in such a manner that the internal tube 19 and, together with the same, the inversion system 20 can be pivoted vertically and horizontally.

The height adjustment device 30 comprises a top adjustment tower (not further designated) that is disposed in the middle region of the center tube 15, while the lateral adjustment device 40 includes a lateral adjustment tower that is offset relative to the former by 90° (not shown). The lateral tower is mounted correspondingly on the side of the center tube 15.

The inversion system 20 has two inversion lens systems 24, 25 that are disposed on an optical axis a in the internal tube 19; and they are displaceably supported in the longitudinal direction relative to the objective lens system and the eyepiece lens system 14, 18 as well as relative to each other along the optical axis a for the purpose of modifying the magnification of the telescope sight 10. To this end, the internal tube 19 has an internal guide sleeve 26 with a guide slot that extends parallel relative to the optical axis a of the inversion system 20 (not designated in further detail), as well as an external worm sleeve 27 that is disposed on the outer circumference of the guide sleeve 26 and that is rotatably supported relative to the same around the optical axis a of the inversion system. Two worm-shaped slots (also not designated in further detail) are configured inside the worm sleeve 27. Each inversion lens system 24, 25 is disposed inside a mount (not designated), which is provided with a driving pin 28, 29. Each driving pin 28, 29 engages through the guide slot of the guide sleeve 26 with one of the worm-shaped slots of the worm sleeve 27, such that, with a rotation of the worm sleeve 27 relative to the guide sleeve 26, the inversion lens systems 24, 25 are adjusted along the optical axis a of the inversion system 20. To actuate the worm sleeve 27, an adjustment ring 13 is provided at the transition from the center tube 15 to the eyepiece tube 16, which is connected to the worm sleeve 27 in a torque-proof manner.

The objective lens system 14 is configured such that a first image plane B1 is created upstream of the inversion system 20, while the eyepiece lens system 18 creates a second image plane B2 downstream of the lens system 24, 25 of the inversion system 20. The image planes B1 and B2 are aligned vertically, respectively, in relation to the optical axis A of the telescopic sight 10. The inversion system 20, on the other hand, is configured such that, using the inversion lens systems 24, 25, it creates in the area of the end 22 on the eyepiece side an image plane BU having a perpendicular alignment relative to the optical axis a of the inversion system 20. As shown in FIG. 1, the image plane BU of the inversion system 20 is disposed in a plan-parallel fashion inside the second image plane B2 of the eyepiece lens system 18, when the inversion system 20 is in the center position thereof; meaning, when the optical axis a of the inversion system 20 is congruent with the optical axis A of the telescopic sight 10. If the inversion system is tilted, on the other hand, —which is shown in further detail in FIG. 2—using the height and lateral adjustment devices 30, 40, the optical axis a of the inversion system 20 is pivoted relative to the optical axis A of the telescopic sight, wherein the swivel bearing 23, the positions of the image plane BU of the inversion system 20 and the position of the image plane B2 of the eyepiece lens system 18 are matched to each other in such a manner that the center points M of the image plane B2 of the eyepiece lens system 18 and the image plane BU of the invention system 20 are always congruent at the point of intersection of the optical axes A and a, respectively.

A first sight aid is provided in the optical path between the objective lens system 14 and the eyepiece lens system 18. This is a reticle 50 that is disposed at the end 21 on the lens side of the inversion system 20, and which is preferably configured as a classical crosshairs graticule 51. The structural design of the graticule can include different patterns (not shown) depending on the purpose of use. The cross hairs graticule 51 is inserted perpendicularly relative to the optical axis a of the inversion system into a mount 52 that is connected to the internal guide sleeve 26 of the internal tube 19 in a torque-proof manner. When the inversion system 20 is—as shown in FIG. 1—in the central position thereof and the optical axis a of the inversion system 20 is, correspondingly, located on the optical axis A of the telescopic sight 10, the axial position of the reticle 50 or of the crosshairs graticule, respectively, is adjusted such that the target marking is located in the first image plane B1. To allow for an axial adjustment of the reticle 50 relative to the image plane B1, the mount 52 is adjustably configured relative to the internal guide sleeve 26 of the internal tube 19 along the optical axis a of the inversion system 20.

A projection means 60 is provided at the end 22 on the eyepiece side of the inversion system 20 (see FIG. 3). A display means 70 is assigned to said projection means that generates information (not shown) and/or an electronic target mark (not shown) as a second sight aid by means of an electronic control device 80, wherein the information and/or the target mark are projected by the projection means 60 in the field of view of the telescopic sight 10, and thereby displayed. The projection means 60 therein generates a projection that is located in a projection plane 63. Said plane has a perpendicular alignment relative to the optical axis a of the inversion system 20, and it is disposed in the image plane BU of the inversion system 20.

The projection means 60 preferably comprises two prisms 61, 62 that rest against each other, directly and in a planar fashion, by the base surfaces 65 thereof, which are inclined relative to the optical axis a of the inversion system 20. The base surfaces 65 constitute therein a semi-permeable boundary area that reflects the image, which is generated by the display means 70, directly into the optical path of the telescopic sight 10, while the front side 64 of the front prism 62, which is directed toward the objective lens system 14, constitutes the projection plane 63, that is also always perpendicularly aligned relative to the optical axis a of the inversion system and fixedly arranged inside the image plane BU of the inversion system 20. The prism 61 has a rear side 61a.

The prisms 61, 62 are preferably made of materials with equal refractive indices and inserted as a rectangular solid form into a mount 74. Said mount is connected in a torque-proof manner to the internal guide sleeve 26 of the internal tube 19. As shown further in FIG. 3, the display means 70, for example an LCD or LED display, rests directly and in a planar fashion on a lateral surface of the rectangular solid form 61, 62, particularly on a side area 66 of the prism 61 that is disposed in the rear. To this end, the mount 74 is fashioned with a recess (not shown in further detail). The result is an especially compact and robust structural assembly.

It can thus be seen that a display means 70 is assigned to the inversion system 20 that generates information and/or an electronically generated target mark by means of the projection means 60 in the projection plane 63. The projection means 60 and the display means 70 are disposed in a common mount 74 that is connected to the inversion system 20, wherein the projection means 60 and the display means 70 constitute together with the mount 74 a single structural unit. If necessary, it is possible to design said structural unit as a pre-mounted assembly unit, thus creating a beneficial assembly-related effect of the telescopic sight 10.

When the inversion system 20 is in the center position thereof—as shown in FIG. 1—and the optical axis a of the inversion system 20 is correspondingly aligned in a congruent fashion with the optical axis A of the telescopic sight 10, the axial position of the front side 64 of the prism 61 is adjusted such that the information and/or target markings, which are represented in the projection plane 63, are located in the image plane BU of the inversion system, and consequently in the second image plane B2 of the eyepiece lens system 18. To allow for an axial adjustment of the projection plane 63 or the front surface 64 of the prism, respectively, relative to the image plane BU, the mount 74 is adjustably configured relative to the internal guide sleeve 26 of the internal tube 19 along the optical axis a of the inversion system 20.

The electronic control device 80 (not shown in further detail) preferably comprises a programmable microprocessor, a memory as well as a suitable power supply by way of a battery or storage battery. The microprocessor executes the compensation calculation of the trajectory based on ballistic and/or other data. The values that the microprocessor calculates are, for example, distance-related information or an electronic target mark that was computed by the microprocessor, with said values then being displayed by the display means 70 and reflected into the field of view of the telescopic sight by means of the projection means 60 and the projection plane 63.

To provide the microprocessor with the data that are necessary or useful for the compensation calculation, the electronic control device 80 includes suitable interfaces. These can be, for example, a connection for a distance-measuring device that is integrated in the telescopic sight 10 (not shown), for example a laser distance meter. In addition or in the alternative, the interface can be a plug 86 that allows for connecting external equipment, for example an external distance-measuring device or a wind-measuring device. Connecting a keyboard is also conceivable that would allow for manually inputting data into to the electronic control device 80, for example information regarding the ammunition that is used. The totality of all data and results are saved in a memory. The results that were computed by the microprocessor are displayed by the display means 70. The electronic control device 80 and the display means 70 are connected to each other via a data line 82. Preferably, the data line is a flat cable that is flexibly routed in the eyepiece tube 16. The electronic control device 80 can also be connected to the display means 70 via a wireless connection. If so, both components must be correspondingly provided with transmitters and receivers.

The crucial advantage of the invention lies in the fact that the projection location for the information and/or the electronic target mark that is generated by the display means 70 is fixedly placed in the rear-side image plane BU of the inversion system 20. Thus, the projection location is not the fixed second image plane B2 of the eyepiece lens system 18 but instead the rear-side image plane BU of the inversion system that tilts together with the inversion system 20.

One preferred embodied example provides that the projection of information and/or of the target mark is/are achieved by a projection means 60 that is fixedly connected to the inversion system 20 and the projection plane 63 of which is located in the rear-side image plane BU of the inversion system 20. The information, for example distance information, and/or an electronic target mark, which was generated according to a calculated ballistic trajectory, are represented via the display means 70 and the projection means 60, preferably a beam splitter, at a defined position in the field of view of the telescopic sight 10. It is possible therein to vary the target mark corresponding to the changing ambient conditions in the field of view.

An important aspect therein is that, irrespective of any tilting of pivoting of the inversion system 20, the location of the projection will always remain in the rear-side image plane BU of the inversion system 20. Simultaneously, the telescopic sight 10 offers the opportunity of embodying an electronic reticle while maintaining the functionality of the telescopic sight 10.

Figure 2:
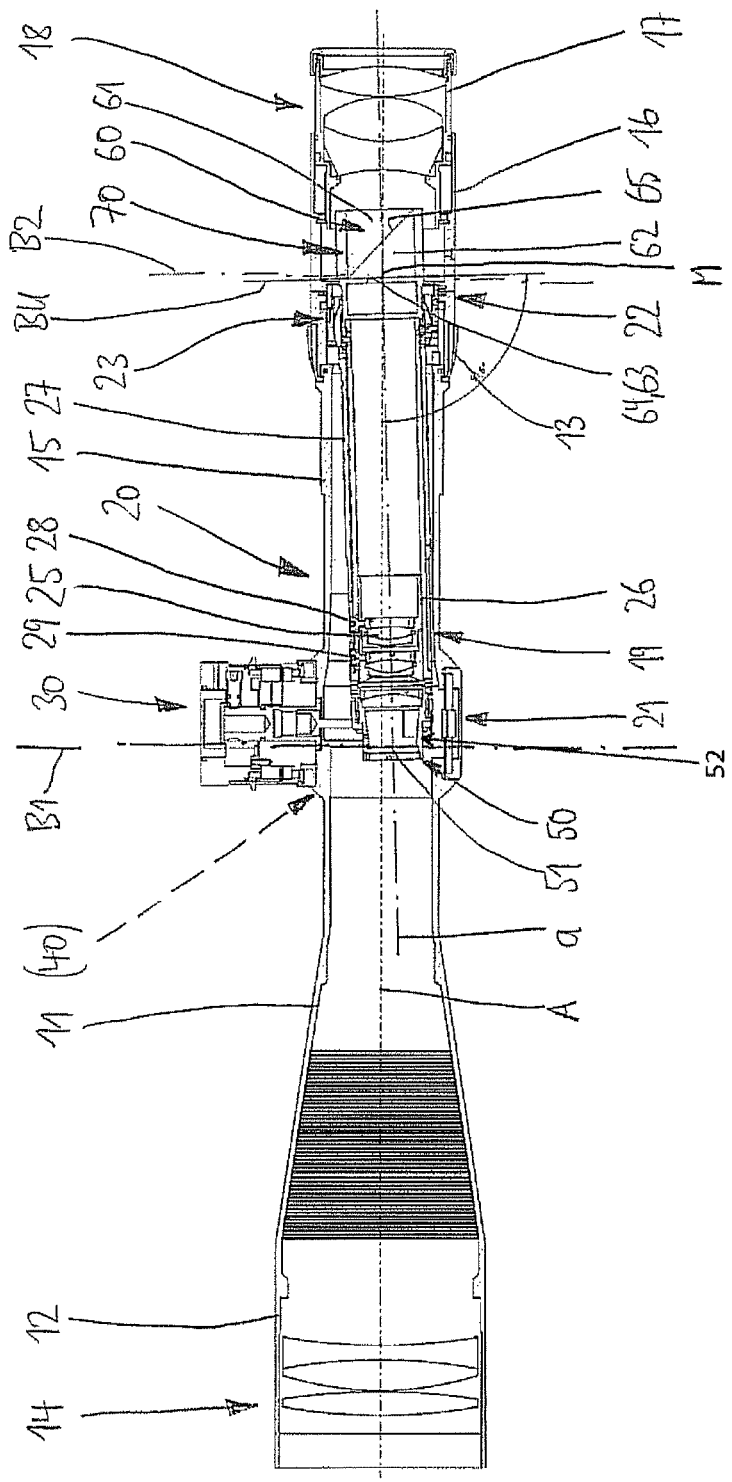
FIG. 2 is a longitudinal section of the telescopic sight from FIG. 1 with an inversion system that is pivoted relative to the optical axis of the telescopic sight.

When, accordingly, the inversion system 20 is tilted vertically or horizontally via the internal tube 19, the optical axis a of the inversion system 20 is tilted relative to the optical axis A of the telescopic sight. Simultaneously, the image plane BU of the inversion system 20 is tilted as well relative to the second image plane B2 of the eyepiece lens system 18, as seen in FIG. 2.

However, due to the fact that the information and/or target marks that is/are generated by the display means 70 and the projection means 60 are located in the image plane BU of the inversion system 20, they are moved together with the image that is generated by the inversion system 20; meaning, there are no spatial differences between the rear-side image plane BU of the inversion system 20 and the target marks and/or information that are reflected into the same.

The invention is not limited to any one of the previously described embodied examples; instead, it is variably adaptable. For example, the projection means 60 can be constituted only of one prism 62, and wherein said prism 62 forms together with a base surface 65, which is inclined relative to the optical axis a of the inversion system 20, a semi-permeable boundary area, and it forms together with a front side 64, that is directed toward the objective lens system 14, the projection plane 63.

Aside from the display means 70, it is also possible to envision an additional light source on or in the inversion system 20. Moreover, a further reticle can be disposed in the image plane BU of the inversion system 20. It is possible to provide an illumination means, which can be switched or dimmed, for the reticle 50 or for any further reticles, and said illumination means can be controlled by the electronic control device 70, if necessary.

It is seen that a telescopic sight 10 includes an objective lens system 14, an eyepiece lens system 18 and an inversion system 20, which is disposed in the optical path between the objective lens system 14 and the eyepiece lens system 18, wherein the inversion system 20 is pivotably supported relative to an optical axis A of the telescopic sight 10 by means of a height adjustment device 30 and a lateral adjustment device 40. The telescopic sight 10 includes, furthermore, a first sight aid in form of a reticle 50, which is disposed at the end 21 on the lens side of the inversion system 20, and a second sight aid in form of a projection means 60 that is disposed at the end 22 on the eyepiece side of the inversion system 20. To avoid projection errors, particularly parallaxes, when fading in ballistic information and/or electronic target marks, and to obtain a telescopic sight that is fully functional even in the event of a failure of the electronic components, it is envisioned for the inversion system 20 to produce at the end 22 on the eyepiece side an image plane BU having a perpendicular alignment relative to the optical axis a of the inversion system 20, for the projection means 60 to generate a projection in the field of view of the telescopic sight 10 that is located in a projection plane 63, wherein the projection plane 63 is aligned perpendicularly relative to the optical axis a of the inversion system 20 and is located in the image plane BU of the inversion system 20, and for a display means 70 to be assigned to the inversion system 20 that generates information and/or an electronically generated target mark in the projection plane 63 via the projection means 60.

Preferably, the projection means 60 is constituted of a prism 62, and wherein the prism 62 constitutes by means of a base surface 65, which is tilted relative to the optical axis a of the inversion system 20, a semi-permeable boundary area and together with the front side 64, which is directed toward the objective lens system 14, the projection plane 63. In the alternative, the projection means 60 is be constituted of two prisms 61, 62 that are disposed directly against each other by the base surfaces 65 thereof, which are inclined relative to the optical axis a of the inversion system 20, and wherein the base surfaces 65 constitute a semi-permeable boundary area, and wherein a front side 64 of a prism 62, which is directed toward the objective lens system 14, constitutes the projection plane 63.

The projection means 60 and the display means 70 are disposed inside a common mount 74 that is connected to the inversion system 20 in a torque-proof manner, which, however, is still adjustable in the direction of the optical axis a of the inversion system 20 relative to the inversion system 20 and/or relative to the image plane BU of the inversion system 20. The same applies with regard to the display means 70, which is preferably connected, however, to one of the prisms 61, 62 of the projection means 60. Overall, it is expedient for the projection means 60 and the display means 70 as well as the mount 74 to be combined into a single unit.

The display means 70 is triggered by a programmable electronic control device 80, and wherein the control device 80 executes a compensation calculation of the trajectory, using a micro process or on the basis of ballistic and/or other data, and displays the corresponding results—in form of information and/or an electronic reticle—via the projection means 60 in the field of view of the telescopic sight 10. The control device 80 has an interface 86 by which the necessary data for calculating the trajectory are read into the control device. Internal measuring devices or sensors can be connected to the interface. However, external devices can be connected as well. The control device 80 is connected to the display means 70 by a cable connection or a wireless connection.

The totality of the characterizing features and benefits, including any structurally related details, spatial arrangements and method steps, that can be derived from the claims, the description and the drawing can be significant as standalone features or in various combinations with regard to the invention.

| List of reference signs | |
| --- | --- |
| A | Optical axis (telescopic sight) |
| a | Optical axis (inversion system) |
| B1 | First image plane |
| B2 | Second image plane |
| BU | Image plane of the inversion system |
| M | Center point |
| 10 | Telescopic sight |
| 11 | Housing |

-continued

| | List of reference signs |
|---|---|
| 12 | Lens tube |
| 13 | Adjustment ring |
| 14 | Objective lens system |
| 15 | Center tube |
| 16 | Eyepiece tube |
| 17 | Sleeve |
| 18 | Eyepiece lens system |
| 19 | Internal tube |
| 20 | Inversion system |
| 21 | End on the lens side |
| 22 | End on the eyepiece side |
| 23 | Swivel bearing |
| 24 | Inversion lens system |
| 25 | Inversion lens system |
| 26 | Guide sleeve |
| 27 | Worm sleeve |
| 28 | Driving pin |
| 29 | Driving pin |
| 30 | Height adjustment device |
| 40 | Lateral height adjustment device |
| 50 | Reticle |
| 51 | Crosshair graticule |
| 52 | Mount |
| 60 | Projection means |
| 61 | Prism |
| 62 | Prism |
| 63 | Projection plane |
| 64 | Front side |
| 65 | Base surface |
| 66 | Area |
| 70 | Display means |
| 74 | Mount |
| 80 | Electronic control device |
| 82 | Data line |
| 86 | Interface |

The invention claimed is:

1. A telescopic sight (10) having an objective lens system (14), an eye piece lens system (18) and an inversion system (20), which is disposed in the optical path between the objective lens system (14) and the eyepiece lens system (18) and pivotably supported by means of a height adjustment device (30) and a lateral adjustment device (40) relative to an optical axis (A) of the telescopic sight (10), having a reticle (50), which is disposed at the end (21) on the objective lens side of the inversion system (20), and having a projection means (60) comprising at least one prism, which is disposed at the end (22) on the eyepiece side of the inversion system (20) in the optical path, characterized
in that the inversion system (20) generates an image plane (BU) at the end (22) on the eyepiece side having a perpendicular alignment relative to the optic axis (a) of the inversion system (20),
in that the projection means (60) generates a projection in the field of view of the telescopic sight (10) that is located inside a projection plane (63), wherein the projection plane (63) is aligned perpendicularly relative to the optical axis (a) of the inversion system (20) and located in the image plane (BU) of the inversion system (20),
in that the inversion system (20) has an electronic display (70) assigned thereto located entirely outside the optical path that generates a piece of information or an electronically generated target mark, and
wherein the one or both of the information and the target mark are projected via the projection means (60) into the projection plane (63) and further wherein the projection means (60) or the electronic display (70) are adjustably configured relative to the optical axis (A) of the inversion system (20).

2. The telescopic sight according to claim 1, characterized in that the projection means (60) is constituted of two prisms (61, 62) that rest directly against each other by the base surfaces (65) thereof, which are inclined relative to the optical axis (a) of the inversion system (20), and wherein the base surfaces (65) form a semi-permeable boundary area.

3. The telescopic sight according to claim 2, characterized in that a front side (64) of the prism (62) that is directed toward the eyepiece lens system (14) constitutes the projection plane (63).

4. The telescopic sight according to claim 2, characterized in that the electronic display (70) is connected to one of the prisms (61, 62) of the projection means (60).

5. The telescopic sight according to claim 1, characterized in that the projection means (60) and the electronic display (70) are disposed inside a common mount (74) that is connected to the inversion system (20).

6. The telescopic sight according to claim 5, characterized in that the common mount (74) is adjustable configured relative to the inversion system (20) and the optical axis (a) of the inversion system (20).

7. The telescopic sight according to claim 5, characterized in that the projection means (60), the electronic display (70) and the common mount (74) constitute a single structural unit.

8. The telescopic sight according to claim 1, characterized in that the electronic display (70) is controlled by a programmable electronic control device (80).

9. The telescopic sight according to claim 8, characterized in that the programmable electronic control device (80) executes a compensation calculation of the trajectory based on ballistic or further data.

10. The telescopic sight according to claim 8, characterized in that the programmable electronic control device includes an interface (86) for accepting ballistic data.

11. The telescopic sight according to claim 8, characterized in that the programmable electronic control device (80) is connected to the electronic display (70) via a cable connection or a wireless connection.

12. The telescopic sight according to claim 1, characterized in that an additional light source is provided, adjacent to the electronic display (70) on or in the inversion system (20).

13. The telescopic sight according to claim 1, characterized in that a further reticle is disposed in the image plane (BU) of the inversion system (20).

14. The telescopic sight according to claim 1, characterized in that an illumination device, which can be switched or dimmed, is provided for the reticle (50) or a further reticle.

15. The telescopic sight according to claim 1, wherein the projection means (60) and the electronic display (70) are disposed inside a common mount (74) that is connected to an eye-piece end of the inversion system (20).

* * * * *